Jan. 23, 1962      F. J. FONTIEN ETAL            3,017,666
       APPARATUS FOR PRODUCING A SMOOTH-SURFACED BODY
              CONSISTING OF A GRANULAR MATERIAL
                    Filed March 25, 1959
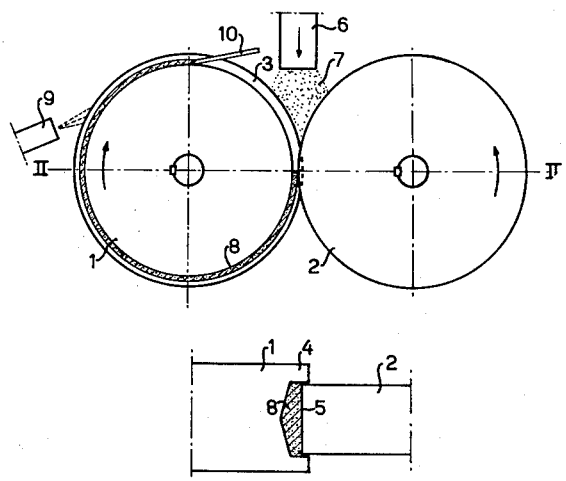
FIG. 1
FIG. 2
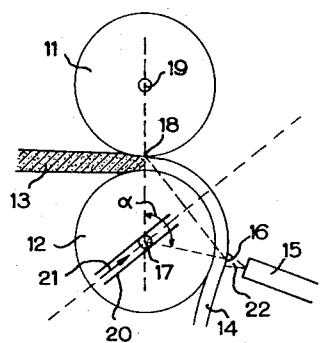
FIG. 3
INVENTORS
FREERK J. FONTEIN
BAUKE S. SIESWERDA
BY Cushman, Darby & Cushman
                    ATTORNEYS United States Patent Office 3,017,666
Patented Jan. 23, 1962

3,017,666
APPARATUS FOR PRODUCING A SMOOTH-SURFACED BODY CONSISTING OF A GRANULAR MATERIAL
Freerk J. Fontein, Heerlen, and Bauke S. Sieswerda, Geleen, Netherlands, assignors to Stamicarbon N.V., Heerlen, Netherlands
Filed Mar. 25, 1959, Ser. No. 801,861
Claims priority, application Netherlands Mar. 29, 1958
2 Claims. (Cl. 18—9)

The present invention relates to a device for producing a smooth-surfaced body consisting of a granular material. A body of this kind is used, for example, in measuring and recording the ash content of a continuously drawn sample by means of a measuring instrument emitting and receiving electron, electromagnetic, light, X-ray and other beams.

One of the principal requirements to be satisfied by such a body is that the surface exposed to the radiation be perfectly smooth. In order to obtain this smooth surface it has previously been proposed first to grind the material, if it is not of uniform particle size, to dry it, if necessary, and then feed it onto a conveyor belt or a similar device, over which belt or device a scraper is arranged for perfectly leveling the upper surface of the material. Subsequently, the resulting body of material is passed under the source of the radiation of the light source.

Measuring instruments of the type referred to above are used, among other things, to control apparatus for manufacturing a product, the composition of which has to satisfy certain requirements. One of their applications is in the processing of ores and raw coal in a separating plant (cf. Belgian Patent No. 516,657). In the processing of coal such a measuring instrument may be used for determining the ash content of the raw material or of a resulting product.

For the control to be effective, it is therefore essential that the time elapsing between sampling and measurement of the sample be short. Consequently, the device for preparing the sample for measurement has to satisfy strict requirements.

An object of the invention is to provide a simplified device adapted to considerably shorten the time elapsing between sampling and measuring, and yet capable of giving good measuring results.

According to the invention, the device consists of two co-operating rotating rollers, at least one of which is driven, one being provided with means to retain the body on it through parts of its revolution, and the other having a smooth outer surface. Preferably, the outer surface of the first-mentioned roller is provided with at least one circumferential groove. This groove or such grooves may be bounded by two substantially parallel upright walls, between which fits the other roller, or a part of its outer surface.

In this device, the material supplied to it is compressed in the narrowing space between the rollers and in the groove where it is provided with a smooth surface. The body of compressed material formed in this manner, which remains in the groove during the further rotation of the rollers, can be passed under a measuring device arranged near the circumference of the first-mentioned roller. Subsequently, the material can be removed by means of a conventional scraper.

The device according to the invention can be used for practically dry as well as for wet materials. If the pressure of the rollers is properly adjusted, it is even possible to compress a practically dry material so that it retains its coherence.

If the material contains much liquid, the excess liquid will be removed during the compression between the rollers. The body of material then has a constant liquid content. This may result in a small error in the indication of the measuring instrument, but, as will be appreciated, correction for this error can be readily made subsequently.

As will be understood, the distance from the source of radiation to that area of the surface of the body which is irradiated should be constant, as otherwise the intensity of the reflected radiation would fluctuate with this distance. Such a constant distance may be obtained by fixing not only the position of the radiation source, but also that of the spindle of the roller carrying the body, while assuring that the body to be measured has a constant thickness by keeping the speed of the driven roller exactly constant and supplying the material at a highly constant rate. It will be evident these requirements are not easily met.

Preferably, therefore, use is made of means adapted to automatically cause a constant distance to be maintained between a radiation source and an area that can be irradiated on the body surface, in those cases where the thickness of the body is apt to vary.

This may be effected in various ways. For instance, it is possible, at least theoretically, to fix only the position of the spindle of the roller carrying the body of material, while the spindle of the other roller can move under the influence of the variation in the thickness of the body, the variation in the position of this spindle being transferred to the radiation source, for example, by means of two toothed racks and an intermediate toothed wheel, or of levers with fixed pivots and/or guide slots, etc. These and similar solutions are rather cumbersome and expensive.

However, for those cases where the diameter of the roller carrying the body is large with respect to the area of the body that can be irradiated, a solution has been found that is most satisfactory yet exceedingly simple. Theoretically, this solution is not exactly correct, but it so closely approximates the theoretical that in actual practice excellent results can be obtained by it.

In this solution, the position of the axis of the roller carrying the body is so alterable with respect to the axis of the other roller and to the radiation source, that, viewed in cross-section, it can be displaced along the median perpendicular to the line connecting the center of the irradiated area with the point where the line passing through the two axes intersects the circumference of the said other roller, means being provided which tend to move the former roller along the said median perpendicularly toward the latter roller, and the angle defined by the center of the said area, the axis of the roller carrying the body, and the axis of the said other roller, being smaller than 180°, and preferably as small as possible, also when the body has it smallest possible thickness.

Another object is to provide a measuring instrument with a device according to the invention.

Further objects and advantages of the invention will be in part obvious and in part pointed out hereinafter.

The novel features of the invention may be best made clear from the following description and accompanying drawings in which:

FIGURE 1 is a vertical cross-sectional view of a device embodying the invention;

FIGURE 2 is an enlarged and fragmentary sectional view taken along the line II—II of FIGURE 1; and FIGURE 3 is a view corresponding to FIGURE 1 and showing another embodiment of the invention.

Referring now to the embodiment illustrated in FIGURES 1 and 2, there are provided two rollers 1, 2, roller 1 having a circumferential groove 3 therein between upright or radial walls 4 (see FIGURE 2). The sample, which, for example, is a granular material, is fed into the narrowing space 7 between the rollers by means of a suitable supply device 6, and compressed in this space into a ribbon-like body 8 by the action of the rollers. This body 8 may, for example, have a width of 15 mm. and a thickness of 3 mm.

Near the outer surface of the roller 1, a measuring device 9, for example, one emitting X-rays, has been mounted. The radiation is reflected by the body 8 to an appropriate receiver (not shown in the drawing). The method of measuring is not a part of the invention, and thus need not be further discussed herein. After having passed the spot where this measuring takes place, the body 8 is suitably removed from the groove 3, as by a scraper 10.

Although to obtain a good measurement it is essential that the surface of the body 8 be perfectly smooth, it is not necessary to grind the material to very a fine size before feeding it to the device of the invention. Larger particles are crushed by the rollers and pressed in among the finer particles in the body 8. Excess material supplied at 6 will drop along the sides of the rollers and can be removed in any desired manner. Preferably, the groove 3 is deeper in the center than at the sides, as best seen in FIGURE 2, which increases the strength of the body 8 and tends to prevent breaking.

The construction of the device shown in FIGURES 1 and 2 may be varied within the scope of the invention. It is possible, for example, to provide in the groove 3 several parallel grooves. A further modification is to improve the adherence of the body 8 to the roller 1 by providing the circumferential wall of the wheel 1, or the groove in this wall, with grooves parallel to the axis.

In the embodiment shown in FIGURE 3, 13 refers to the granular material being fed between rollers 11 and 12 which compress it into a body 14 that is carried by roller 12 from the point of compression. A suitable radiation source 15 emits a beam of rays 22, the center of which impinges upon the body 14 at the point 16. The spindle 19 of roller 11 is mounted in a fixed position. The spindle 17 of roller 12 is so supported that it is capable of travelling along a path 20, with suitable means, such as a spring acting on the spindle 17, creating a constant force tending to displace the roller 12 in the direction indicated by the arrow 21. The path 20 coincides with the median perpendicular to the line drawn between points 18—16, the point 18 being determined as the point of intersection between the line connecting the spindles 19—17 and the circumference of roller 11. If the body 13 becomes thinner, the roller 12 is slightly displaced toward roller 11 and source 15 so that the distance between the radiation source and the body 14 remains substantially the same, as should be evident. Conversely, if the body 13 becomes thicker, the roller 12 will be displaced away from roller 11 and source 15 so that the distance between the radiation source and body 14 will remain substantially the same.

The accuracy with which this device operates can be further enhanced by a proper choice of dimensions and arrangement. For instance, as already mentioned, it is desirable to use a roller 12 which has a large diameter as compared with the area of body 14 irradiated by the beam 22. Also, the width of angle $\alpha$, which is defined between the lines 19—17 and 17—16, is important in connection with the accuracy of the device. The smaller this angle, the better, as this means less variation of the angle at which the radiation source stands with respect to the surface of the body. Moreover, if $\angle \alpha$ is nearly 180°, the position of roller 12 will have to be shifted too much if there is only a small change in the thickness of the body 14, while it is obvious that if $\angle \alpha = 180°$, the device fails to operate altogether. However, by carefully selecting the dimensions and arrangement, for example, by having them as indicated in the aforedescribed embodiment, a highly suitable device is produced which fully satisfies the requirements of accuracy, etc.

It will be understood that the roller 12 may be provided with a circumferential groove, such as the groove 3 in roller 1 of FIGURES 1 and 2.

The present invention will thus be seen to completely and effectively accomplish the objects enumerated hereinabove. It will be realized, however, that various changes and substitions may be made to the specific embodiments disclosed herein for the purpose of illustrating the principles of this invention, without departing from these principles. Therefore, this invention includes all modifications encompassed within the spirit and scope of the following claims.

What is claimed is:

1. Apparatus for measuring properties of granular material by reflecting on the material electron, electromagnetic, light, X-ray beams, and the like, comprising: means for producing a smooth-surfaced body of the granular material, said means consisting of two cooperating rollers mounted for rotation about substantially parallel axes; means for rotating at least one of said rollers, one of said rollers being provided with means for retaining the body on it through part of its revolution, and the other of said rollers having a smooth outer surface; a radiation source arranged to direct a beam on a predetermined area of the body on said one roller; and means for maintaining constant the distance between said radiation source and said area irrespective of variations in the thickness of said body.

2. Apparatus as defined in claim 1 wherein said last-named means includes: means mounting the roller carrying the body so that the axis of this roller may be displaced relative to the axis of the other roller and the radiation source and along the median perpendicular to the line connecting the center of said area with the point where a line passing through the axes of said rollers intersects the circumference of said other roller; and means tending to move said one roller along said median and towards the other roller; the angle defined by the center of said area, the axis of said one roller, and the axis of said other roller being less than 180° when said body is of its minimum thickness.

References Cited in the file of this patent

UNITED STATES PATENTS

| | | |
|---|---|---|
| 1,544,305 | Fisher | June 30, 1925 |
| 1,678,884 | Sweet | July 31, 1928 |
| 1,989,038 | Brown | Jan. 22, 1935 |
| 2,012,833 | Smith | Aug. 27, 1935 |
| 2,025,562 | Balsinger | Dec. 24, 1935 |
| 2,287,808 | Lehde | Jan. 30, 1942 |
| 2,397,608 | Johnson | Apr. 2, 1946 |
| 2,424,856 | Schnuck | Jan. 29, 1947 |
| 2,578,625 | Bowers et al. | Dec. 11, 1951 |
| 2,608,717 | Kay | Sept. 2, 1952 |
| 2,620,320 | Novak et al. | Dec. 2, 1952 |
| 2,884,531 | Bosch | Apr. 28, 1959 |
| 2,904,829 | Heck | Sept. 22, 1959 |